(12) United States Patent
Wang

(10) Patent No.: US 8,538,160 B2
(45) Date of Patent: Sep. 17, 2013

(54) ELECTRONIC DEVICE AND METHOD FOR SORTING PICTURES

(75) Inventor: Cho-Hao Wang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 345 days.

(21) Appl. No.: 12/982,882

(22) Filed: Dec. 31, 2010

(65) Prior Publication Data

US 2011/0280486 A1 Nov. 17, 2011

(30) Foreign Application Priority Data

May 17, 2010 (TW) ............................... 99115736 A

(51) Int. Cl.
*G06K 9/00* (2006.01)
*G06K 9/54* (2006.01)
*G03B 27/52* (2006.01)

(52) U.S. Cl.
USPC .............. 382/195; 382/181; 382/305; 355/40

(58) Field of Classification Search
USPC ................. 382/100, 141, 181, 209, 217, 218, 382/195, 224, 115, 118, 305; 348/42, 207.99, 348/E5.024, E5.042; 355/18, 39, 72, 40; 715/700, 716, 719
See application file for complete search history.

(56) References Cited

U.S. PATENT DOCUMENTS

| 6,430,306 | B2 * | 8/2002 | Slocum et al. ................ 382/118 |
| 7,437,005 | B2 * | 10/2008 | Drucker et al. ............... 382/224 |
| 7,515,755 | B2 * | 4/2009 | Littooij et al. ................ 382/218 |
| 8,144,939 | B2 * | 3/2012 | Thorn .......................... 382/115 |
| 8,233,708 | B2 * | 7/2012 | Yamauchi et al. ............ 382/165 |
| 2003/0214524 | A1 * | 11/2003 | Oka .............................. 345/700 |
| 2008/0229232 | A1 * | 9/2008 | Schulz et al. ................. 715/781 |

* cited by examiner

*Primary Examiner* — Sheela Chawan
(74) *Attorney, Agent, or Firm* — Altis Law Group, Inc.

(57) ABSTRACT

A system and method for sorting pictures stored in an electronic device receives sorting features of the pictures and a sorting priority sequence of the sorting features set by a user. The pictures are sorted in each of the sorting features according to the sorting priority sequence. If pictures have no sorting features, the pictures are stored in a file of a storage system of the electronic device. The pictures having the same sorting sub-feature of the sorting feature are stored in a picture file.

9 Claims, 3 Drawing Sheets

ELECTRONIC DEVICE AND METHOD FOR SORTING PICTURES

BACKGROUND

1. Technical Field

Embodiments of the present disclosure relate to systems and methods for managing pictures, and more particularly, to an electronic device and a method for sorting pictures.

2. Description of Related Art

Many electronic devices (e.g., mobile phones) are capable of capturing pictures. There may be so many pictures in an electronic device (e.g., a mobile phone) that a user of the electronic device may waste much time searching for a favorite picture.

DETAILED DESCRIPTION

The disclosure is illustrated by way of examples and not by way of limitation in the fingers of the accompanying drawings in which like references indicate similar elements. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
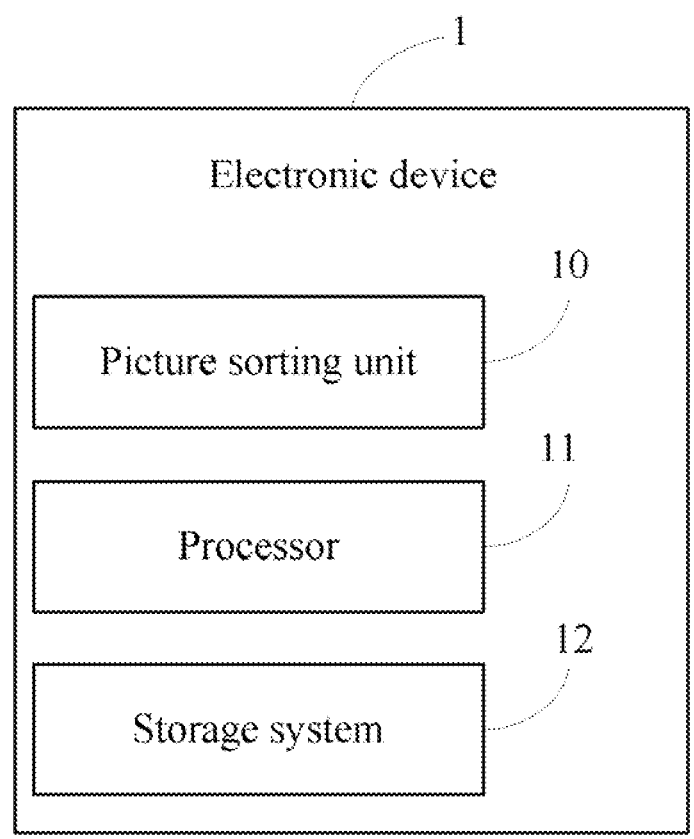
FIG. 1 is a block diagram of one embodiment of an electronic device including a picture sorting unit.

FIG. 1 is a block diagram of one embodiment of an electronic device 1 including a picture sorting unit 10. In one embodiment, the electronic device 1 includes a processor 11 and a storage system 12. Depending on the embodiment, the electronic device 1 may be a computer, a camera, or a mobile phone. The storage system 12 stores a plurality of pictures and attributes of each picture. In some embodiments, the attributes may include a size, a storage path and recognizable features of each picture. The recognizable features may be facial features or location feature. In some embodiments, the facial features may include size and location of hair, eyes, nose, and mouth of a person in the picture. The location feature is a position (e.g., longitude, latitude) of the electronic device 1 when the picture was captured by an electronic device 1.

The picture sorting unit 10 may be used to sort all the pictures stored in the electronic device 1 according to each of the recognizable features set by a user. The picture sorting unit 10 includes a number of function modules (detailed description is given in FIG. 2). The function modules may comprise computerized code in the form of one or more programs that are stored in the storage system 12. The computerized code includes instructions that are executed by the processor 11, to provide one or more aforementioned operations of the picture sorting unit 10.

Figure 2:
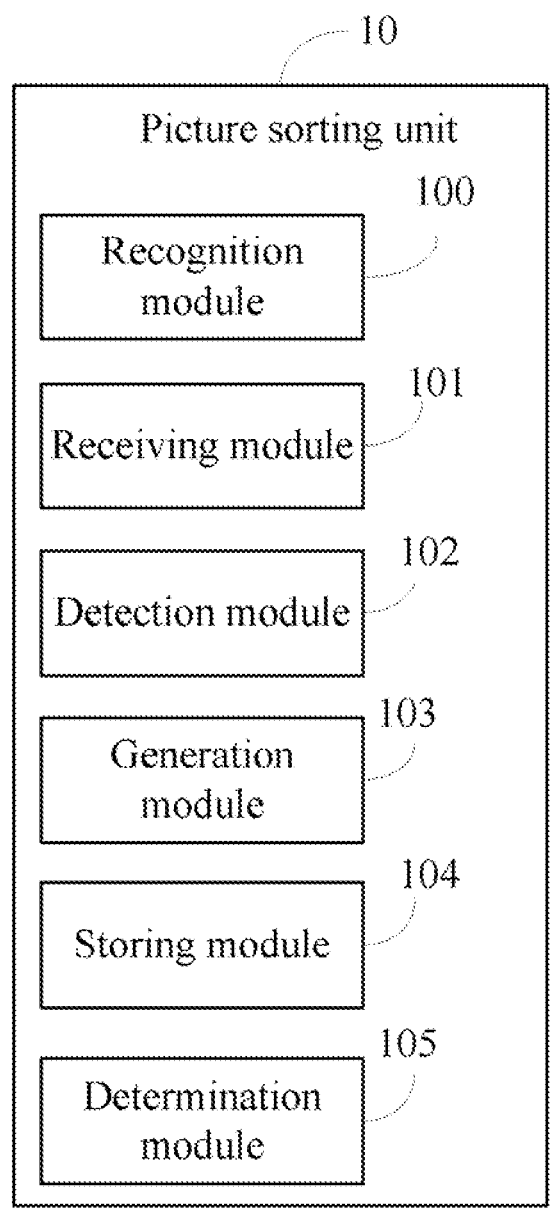
FIG. 2 is a block diagram of one embodiment of function modules of the picture sorting unit in FIG. 1.

As shown in FIG. 2, the picture sorting unit 10 may include a recognition module 100, a receiving module 101, a detection module 102, a generation module 103, a storing module 104, and a determination module 105.

The recognition module 100 recognizes all of the recognizable features of each picture using a feature extraction algorithm. In some embodiments, the feature extraction algorithm may be used in an area of image processing which involves using algorithms to detect and isolate various desired features of a digitized image.

The receiving module 101 receives sorting features and a sorting priority sequence set by a user using an input device (not shown) of the electronic device 1. In some embodiments, the input device may be a keypad. The sorting priority sequence is a priority selection of the sorting features for sorting the pictures. For example, the sorting features may include a facial feature, a location feature. The sorting priority sequence may be set as that the facial feature has a first sorting priority and the location feature has the second sorting priority. Thereby the pictures are sorted according to the facial features firstly, then the sorted pictures are sorted once more according to the location features.

The detection module 102 detects if there are any pictures having no sorting features. For example, the detection module 102 detects if there are any pictures that do not have the facial features or the location features.

If the detection module 102 determines that there are any pictures having no sorting features, the generation module 103 generates a file in the storage system 12, and the storing module 104 stores the pictures having no sorting features into the file of the storage system 12. In some embodiments, the file may be named as "other."

The determination module 105 searches for pictures having a first sorting feature according to the sorting features and the sorting sequence. For example, as mentioned above, the facial feature has the first sorting priority, then facial feature is regarded as the first sorting features, the location feature is regarded as the second sorting features. The determination module 105 searches for pictures which have the facial features.

The determination module 105 also determines searched pictures which have the same sorting sub-features, and further searches for a picture file of each of the same sorting sub-features. For example, the determination module 105 determines searched pictures which have the same facial sub-features, namely determines searched pictures which belongs to one person. In some embodiments, the facial sub-features may be a size and a shape of a nose, eyes, and a mouth.

The detection module 102 detects if there is a picture file of each of the same sorting sub-features in the storage system 12. If there is the picture file of each of the same sorting sub-features in the storage system 12, the storing module 104 directly stores the pictures having the same sorting sub-features in the picture file.

If there is no picture file of the same sorting sub-feature in the storage system 12, the generation module 103 generates a picture file to store the pictures having the same sorting sub-features. The storing module 104 stores the pictures having the same sorting sub-features in the picture file. For example, if picture A, picture B and picture C have a first same sorting sub-feature "a", the storing module 104 stores the picture A, picture B and picture C in a first file corresponding to the first same sorting sub-feature "a". If picture D, picture E and picture F have a second same sorting sub-feature "b", the storing module 104 stores the picture D, picture E and picture F in a second file corresponding to the second same sorting sub-feature "b".

The detection module 102 detects if the pictures stored in the electronic device 1 have been sorted according to each of the sorting features set by the user. If the pictures have not been sorted according to any other sorting feature, the determination module 105 determines a next sorting feature according to the sorting priority sequence. For example, the determination module 105 determines the next sorting feature is the location feature.

Figure 3:
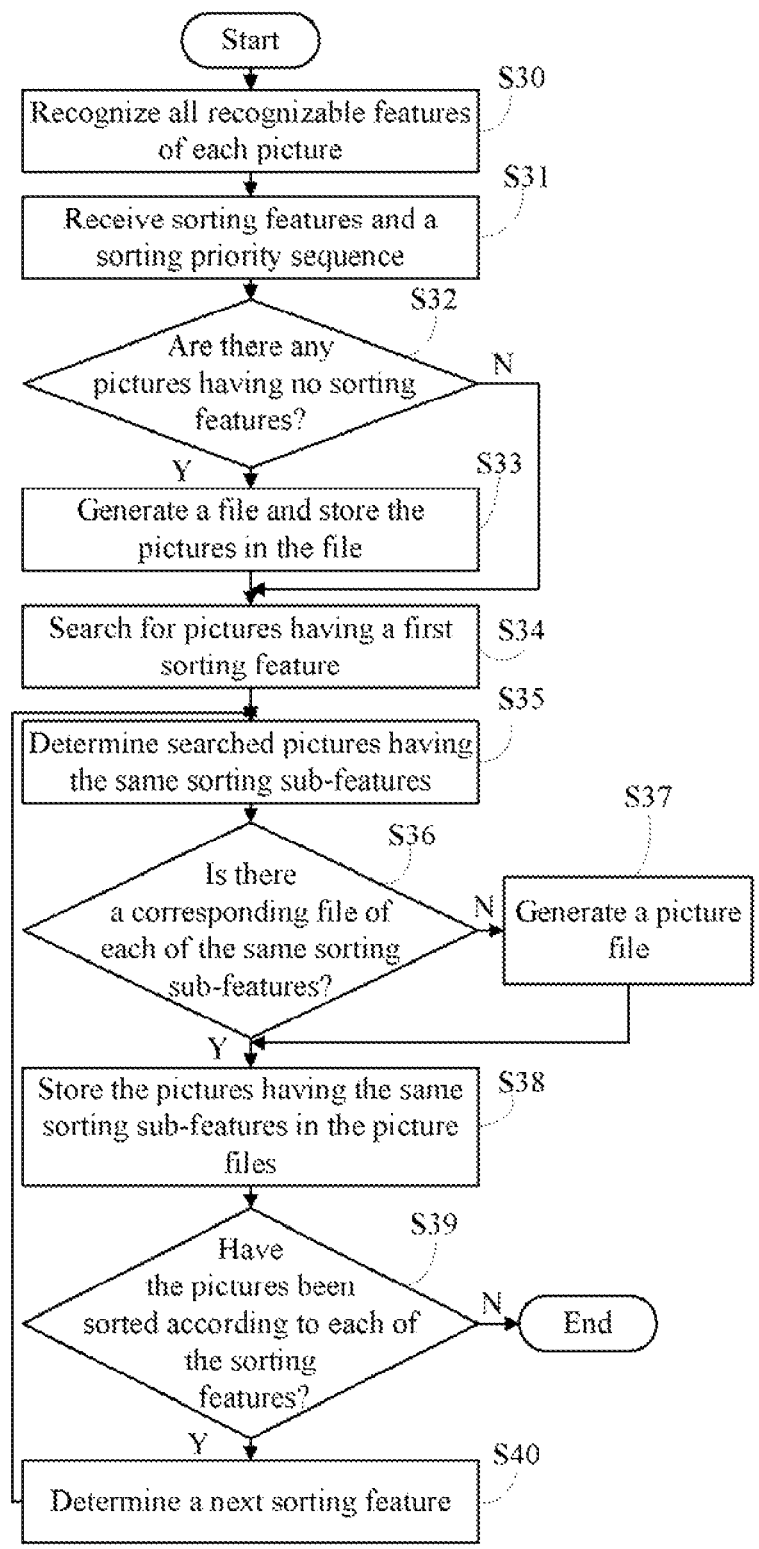
FIG. 3 is a flowchart of one embodiment of a method for sorting pictures.

FIG. 3 is a flowchart of one embodiment of a method for sorting pictures. Depending on the embodiment, additional blocks may be added, others removed, and the ordering of the blocks may be changed.

In block S30, the recognition module 100 recognizes all of the recognizable features of each picture using a feature extraction algorithm. In some embodiments, the feature extraction algorithm may be used in an area of image processing which involves using algorithms to detect and isolate various desired portions or features of a digitized image.

In block S31, the receiving module 101 receives sorting features and a sorting priority sequence set by a user using an input device of the electronic device 1.

In block S32, the detection module 102 detects if there are any pictures having no sorting features. If there are any pictures having no sorting features, block S33 is implemented. If all the pictures have sorting features, block S35 is implemented.

In block S33, the generation module 103 generates a file in the storage system 12, and the storing module 104 stores the pictures having no sorting features into the file of the storage system 12.

In block S34, the determination module 105 searches for pictures having a first sorting feature according to the sorting features and the sorting sequence.

In block S35, the determination module 105 determines searched pictures which have the same sorting sub-features, and searches for a picture file of each of the same sorting sub-features.

In block S36, the detection module 102 detects if there is a picture file of each of the same sorting sub-features in the storage system 12. If there is no picture file the same sorting sub-feature in the storage system 12, block S37 is implemented. If there is the picture file of each of the same sorting sub-features in the storage system 12, block S38 is implemented.

In block S37, the generation module 103 generates a picture file. In block S38, the storing module 104 stores the pictures having the same sorting sub-features in the picture files.

In block S39, the detection module 102 detects if the pictures stored in the electronic device 1 have been sorted according to each of the sorting features set by the user. If the pictures have no been sorting according to any other sorting feature, block S40 is implemented. If the pictures have been sorting according to each of the sorting features set by the user, the procedure ends.

In block S40, the determination module 105 determines a next sorting feature according to the sorting priority sequence, and block S36 is repeated.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
a storage system that stores pictures;
at least one processor; and
one or more programs being stored in the storage system and executable by the at least one processor, the one or more programs comprising:
a recognition module operable to recognize recognizable features of the pictures stored in the storage system, wherein the recognizable features comprise facial features and location features;
a receiving module operable to receive sorting features of the pictures stored in the storage system and a sorting priority sequence of the sorting features set by a user, the sorting features comprising a plurality of sort sub-features, wherein the sorting priority sequence is a priority selection of the sorting features for sorting the pictures and the sorting features comprise the recognizable features;
a determination module operable to searches for pictures in the storage system according to the sorting features and the sorting sequence, and determine which of the searched pictures having the same sorting sub-features; and
a storing module operable to store the pictures having the same sorting sub-features in a picture file corresponding to the sorting sub-feature of the storage system.

2. The electronic device as claimed in claim 1, wherein the one or more programs further comprise:
the storing module further operable to store the pictures having no sorting features in a file of the storage system.

3. The electronic device as claimed in claim 2, wherein
the generation module is further operable to generate picture files if there are no picture file of the same sorting sub-features; and
the storing module is further operable to store the pictures having the same sorting sub-features in the picture files.

4. A method of an electronic device comprising a storage system storing pictures, the method comprising:
(a) recognizing recognizable features of the pictures stored in the storage system, wherein the recognizable features comprise facial features and location features;
(b) receiving sorting features of the pictures and a sorting priority sequence of the sorting features set by a user, the sorting features comprising a plurality of sort sub-features, wherein the sorting priority sequence is a priority selection of the sorting features for sorting the pictures and the sorting features comprise the recognizable features;
(c) searching for pictures in the storage system having a first sorting feature according to the sorting features and the sorting sequence;
(d) determining which of the searched pictures having the same sorting sub-features;
(e) storing the pictures having the same sorting sub-features in a picture file corresponding to the sorting sub-feature of the storage system; and
(f) sorting the pictures stored in the electronic device according to a next sorting feature and executing step (d) to (e) until the pictures stored in the electronic device have been sorted according to each of the sorting features.

5. The method as claimed in claim 4, before step (b) further comprising:
storing the pictures having no sorting features in a file of the storage system.

6. The method as claimed in claim 4, wherein step (e) comprises:

generating a picture file if there are no picture files of the same sorting sub-features; and storing the pictures having the same sorting sub-features in the picture files.

7. A non-transitory storage medium storing a set of instructions, the set of instructions capable of being executed by a processor to perform a method for sorting pictures in an electronic device, the method comprising:

(a) recognizing recognizable features of the pictures stored in the storage system, wherein the recognizable features comprise facial features and location features;

(b) receiving sorting features of the pictures and a sorting priority sequence of the sorting features set by a user, the sorting features comprising a plurality of sort sub-features, wherein the sorting priority sequence is a priority selection of the sorting features for sorting the pictures and the sorting features comprise the recognizable features;

(c) searching for pictures in the storage system having a first sorting feature according to the sorting features and the sorting sequence;

(d) determining which of the searched pictures having the same sorting sub-features;

(e) storing the pictures having the same sorting sub-features in a picture file corresponding to the sorting sub-feature of the storage system; and (f) sorting the pictures stored in the electronic device according to a next sorting feature and executing step (d) to (e) until the pictures stored in the electronic device have been sorted according to each of the sorting features.

8. The storage medium as claimed in claim 7, before step (b) further comprising:

storing the pictures having no sorting features in a file of the storage system.

9. The storage medium as claimed in claim 7, wherein step (3) comprises:

generating a picture file if there are no picture files of the same sorting sub-features; and storing the pictures having the same sorting sub-features in the picture files.

\* \* \* \* \*